US011203420B2

(12) United States Patent
Riverin et al.

(10) Patent No.: US 11,203,420 B2
(45) Date of Patent: Dec. 21, 2021

(54) SYSTEM AND METHOD FOR CONTROLLING ENGINE SPEED IN MULTI-ENGINE AIRCRAFT (71) Applicant: PRATT & WHITNEY CANADA CORP., Longueuil (CA)

(72) Inventors: Guy Riverin, Montreal (CA); Jason Tremblay, Montreal (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 164 days.

(21) Appl. No.: 16/402,598

(22) Filed: May 3, 2019

(65) Prior Publication Data

US 2020/0346748 A1 Nov. 5, 2020

(51) Int. Cl.
*B64C 27/57* (2006.01)
*B64D 31/06* (2006.01)
*F02C 6/00* (2006.01)

(52) U.S. Cl.
CPC .............. *B64C 27/57* (2013.01); *B64D 31/06* (2013.01); *F02C 6/00* (2013.01)

(58) Field of Classification Search
CPC . B64C 27/57; B64D 31/06; F02C 6/00; F02C 9/42; F05D 2260/96; F05D 2270/02; F05D 2270/114
See application file for complete search history.

(56) References Cited

U.S. PATENT DOCUMENTS

| | | | |
|---|---|---|---|
| 7,949,440 B2 * | 5/2011 | Ramos | F02C 9/44 701/14 |
| 7,974,760 B2 | 7/2011 | Rowley et al. | |
| 9,051,055 B2 | 6/2015 | Schaeffer | |
| 9,714,087 B2 | 7/2017 | Matsuda | |
| 9,932,120 B2 * | 4/2018 | Fisher | F04D 29/362 |
| 2007/0138338 A1 * | 6/2007 | Luo | F16F 15/005 244/54 |
| 2008/0276620 A1 * | 11/2008 | Ullyott | F01D 21/06 60/773 |
| 2011/0046863 A1 * | 2/2011 | Tezuka | F02C 9/46 701/100 |

(Continued)

OTHER PUBLICATIONS

Extended European Search Report dated Oct. 2, 2020 in counterpart EP application.

*Primary Examiner* — Mussa A Shaawat
(74) *Attorney, Agent, or Firm* — Norton Rose Fulbright Canada LLP (57) ABSTRACT Method and system for controlling engine speed in a multi-engine aircraft, comprising monitoring a request for a first engine and a second engine to generate a given thrust and determining a corresponding engine speed for the first engine and the second engine in accordance with the given thrust. When the corresponding engine speed is outside of a selected speed range, a first engine speed and a second engine speed are allowed to track the corresponding engine speed. When the corresponding engine speed is within the selected speed range, a transition of the first engine speed and the second engine speed through the selected speed range is staggered by allowing one of the first engine speed and the second engine speed to transition through the selected speed range while holding the other of the first engine speed and the second engine speed outside of the selected speed range.

20 Claims, 7 Drawing Sheets

(56) References Cited

U.S. PATENT DOCUMENTS

| | | | | |
|---|---|---|---|---|
| 2011/0198440 A1* | 8/2011 | Saucray | ................ | B64D 31/12 |
| | | | | 244/69 |
| 2011/0318162 A1* | 12/2011 | Cottrell | .................. | F01D 9/065 |
| | | | | 415/13 |
| 2012/0174559 A1* | 7/2012 | Ling | ........................ | F02K 1/16 |
| | | | | 60/204 |
| 2015/0176431 A1* | 6/2015 | Raykowski | ............. | F16C 19/52 |
| | | | | 415/9 |
| 2016/0069268 A1 | 3/2016 | Chapman | | |
| 2017/0350459 A1* | 12/2017 | Rice | ........................ | F04D 19/02 |
| 2019/0052206 A1 | 2/2019 | Noderer | | |
| 2019/0127076 A1* | 5/2019 | Hodges | ................ | B64D 31/10 |
| 2019/0131902 A1* | 5/2019 | Ciciriello | ............. | F16C 17/028 |
| 2020/0301392 A1* | 9/2020 | Nardella | ................ | B64D 27/10 |
| 2021/0062726 A1* | 3/2021 | Kathirchelvan | ....... | G01H 17/00 |

* cited by examiner

SYSTEM AND METHOD FOR CONTROLLING ENGINE SPEED IN MULTI-ENGINE AIRCRAFT

TECHNICAL FIELD

The present disclosure relates generally to aircraft engines, and more particularly to control of speed and/or thrust of engines in multi-engine aircraft.

BACKGROUND OF THE ART

Engine vibration monitoring systems for aircraft record engine rotor vibration levels and may detect if the rotors are out-of-balance. In some circumstances, excessive engine vibrations are caused due to certain weather conditions, which can be exacerbated by having the engine operating in a given speed band.

Preventing one or more engines from operating at certain speeds, for example to minimize engine operation with high fan imbalance, can have many repercussions, such as cabin noise, cabin comfort, engine and aircraft speed fluctuations, and pilot workload.

Therefore, improvements are needed.

SUMMARY

In accordance with a broad aspect, there is provided a method for controlling engine speed in a multi-engine aircraft. The method comprises monitoring a request for a first engine and a second engine to generate a given thrust and determining a corresponding engine speed for the first engine and the second engine in accordance with the given thrust. When the corresponding engine speed is outside of a selected speed range, the speed range having a first boundary and a second boundary, a first engine speed and a second engine speed are allowed to track the corresponding engine speed. When the corresponding engine speed is within the selected speed range, a transition of the first engine speed and the second engine speed through the selected speed range is staggered by allowing one of the first engine speed and the second engine speed to transition through the selected speed range while holding the other of the first engine speed and the second engine speed outside of the selected speed range.

In accordance with another broad aspect, there is provided a system for controlling engine speed in a multi-engine aircraft. The system comprises at least one processing unit and a non-transitory computer-readable medium having stored thereon program instructions. The program instructions are executable by the at least one processing unit for monitoring a request for a first engine and a second engine to generate a given thrust and determining a corresponding engine speed for the first engine and the second engine in accordance with the given thrust. When the corresponding engine speed is outside of a selected speed range, the speed range having a first boundary and a second boundary, a first engine speed and a second engine speed are allowed to track the corresponding engine speed. When the corresponding engine speed is within the selected speed range, a transition of the first engine speed and the second engine speed through the selected speed range is staggered by allowing one of the first engine speed and the second engine speed to transition through the selected speed range while holding the other of the first engine speed and the second engine speed outside of the selected speed range.

Features of the systems, devices, and methods described herein may be used in various combinations, in accordance with the embodiments described herein.

BRIEF DESCRIPTION OF THE DRAWINGS

Reference is now made to the accompanying figures in which.

It will be noted that throughout the appended drawings, like features are identified by like reference numerals.

DETAILED DESCRIPTION

There is described herein methods and systems for the control of two or more engines of a multi-engine aircraft, to achieve a net engine thrust while keeping each individual engine's speed outside of a selected speed range. Each engine has its own individual speed control system which does not require interaction with the speed control system of the other engine(s), this approach gives control system independence between engines. The aircraft targets a given total thrust. The methods and systems described herein allow the engines to provide the total thrust with a low perceptible impact on the aircraft's performance while the individual engines avoid dwelling in an undesirable speed band and minimize transitions through the undesirable speed band.

Figure 1:
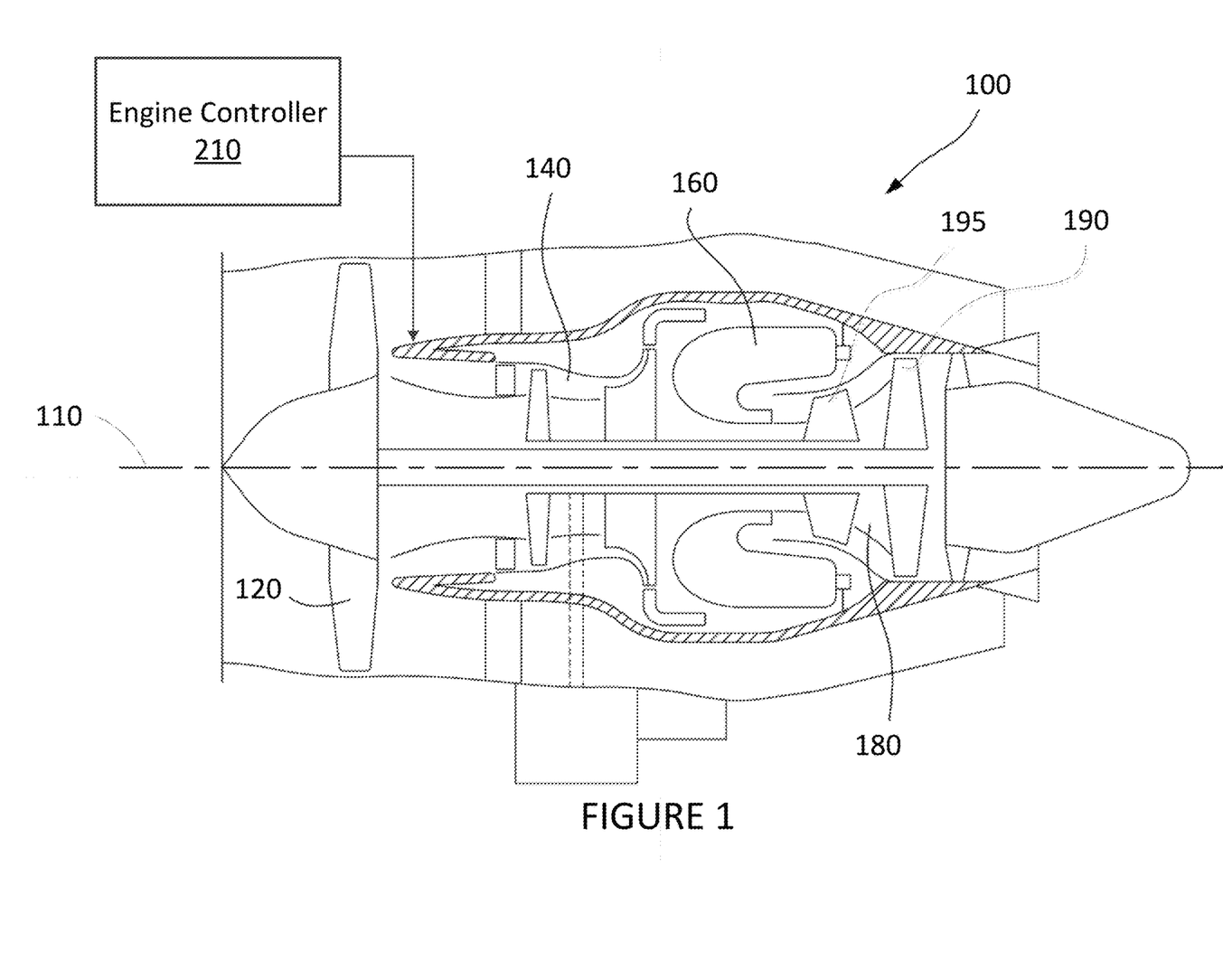
FIG. 1 is a schematic cross-sectional view of a gas turbine engine, in accordance with some embodiments.

With reference to FIG. 1, there is illustrated an example engine 100 to which the engine control methods and systems described herein may be applied. Note that while engine 100 is a turbofan engine, the engine control methods and systems may be applicable to turboprop, turboshaft, and other types of gas turbine engines. In addition, the engine 100 may be an auxiliary power unit (APU), an auxiliary power supply (APS), a hybrid engine, or any other suitable type of engine.

Engine 100 generally comprises in serial flow communication: a fan 120 through which ambient air is propelled, a compressor section 140 for pressurizing the air, a combustor 160 in which the compressed air is mixed with fuel and ignited for generating an annular stream of hot combustion gases, and a turbine section 180 for extracting energy from the combustion gases. Axis 110 defines an axial direction of the engine 100. In some embodiments, a low pressure spool is composed of a low pressure shaft and a low pressure turbine. The low pressure shaft drives the propeller 120. A high pressure spool is composed of a high pressure turbine attached to a high pressure shaft, which is connected to the compressor section 140. It should be noted that other configurations for the engine 100 are also considered.

Control of the operation of the engine 100 can be effected by one or more control systems, for example an engine controller 210. The engine controller 210 can modulate a fuel flow rate provided to the operating engine 100, the position and/or orientation of variable geometry mechanisms within the engine 100, a bleed level of the engine 100, and the like. In accordance with the embodiments described herein, the engine controller 210 can operate the engine 100 so as to keep the speed of a given engine out of a selected speed range while maintaining the sum of the thrust of multiple engines to a level commanded by the aircraft. The engine controller 210 is configured to regulate engine speed, which is directly correlated to thrust. Thrust-setting logic in the engine controller 210 gathers parameters such as ambient conditions, bleed configuration, and thrust request (from a thrust lever) and outputs the engine speed at which the engine 100 should be regulated in order to deliver the required thrust.

Figure 2:
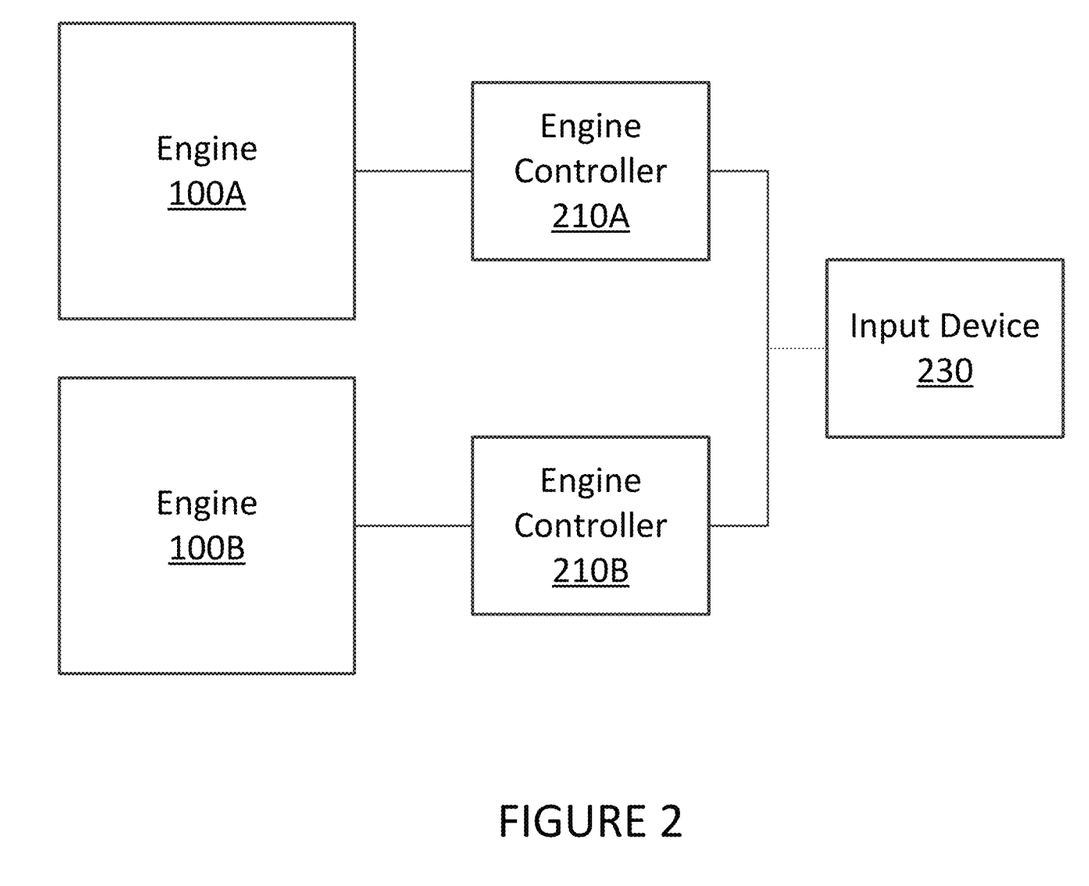
FIG. 2 is a block diagram of a system for controlling engine speed around a selected speed range, in accordance with some embodiments.

With reference to FIG. 2, a first engine 100A is provided with a first engine controller 210a, and a second engine 100b is provided with a second engine controller 210b. In some embodiments, a single engine controller 210 may be configured to operate the first engine 100a and the second engine 100b. In some embodiments, the first engine controller 210a and the second engine controller 210b are communicatively coupled to exchange information, such as data regarding a respective engine 100a, 100b to which a given engine controller 210a, 210b is coupled. Although only two engines 100a, 100b are illustrated, it will be understood that the methods and systems described herein are applicable to more than two engines.

The engine controllers 210a, 210b are communicatively coupled to the engines 100a, 100b, respectively, for, among other things, managing operation of the engines 100a, 100b around the selected speed range. The selected speed range, also referred to herein as a No Dwell Zone (NDZ), comprises an upper boundary and a lower boundary, also referred to as a first boundary and a second boundary. Note that the first boundary can be the upper boundary or the lower boundary, and the second boundary can be the lower boundary or the upper boundary, depending on a direction of transition through the NDZ. In some embodiments, the boundaries form part of the NDZ. In some embodiments, the NDZ corresponds to the values between the boundaries and excludes the values at the boundaries. The NDZ may comprise various ranges and be of various sizes.

Each engine controller 210a, 210b receives a request to operate a respective engine 100a, 100b so as to generate a certain amount of thrust. The request is received, for example, from an input device 230. In some embodiments, the input device 230 is a throttle control in a cockpit of the aircraft, to control speed, power, and/or thrust. In some embodiments, the input device 230 is a control system or computing device, such as an aircraft computer, which is itself in receipt of a speed, power and/or thrust request from another source, such as the throttle control. In some embodiments, the input device 230 is an autopilot and/or an autothrottle of an aircraft. Although a single input device 230 is illustrated, each engine controller 210a, 210b may be connected to its own input device 230, from which it receives a speed, power, and/or thrust request for a corresponding engine 100a, 100b. Other configurations are also considered.

Each engine controller 210a, 210b may manage its corresponding engine 100a, 100b independently of cross-engine communication. To reduce the amplitude of thrust step changes and the frequency of engine transitions through the NDZ, engine-specific thresholds are used to allow the engines 100a, 100b to transition through the NDZ. The engine-specific thresholds may be staggered and position-specific.

Each engine 100a, 100b is assigned an engine position. For example, a two-engine aircraft may have a left-hand engine and a right-hand engine. A four-engine aircraft may have positions "A", "B", "C", and "D" assigned to the engines.

A request is received for the engines to generate a given thrust. A corresponding engine speed is determined in order to provide the given thrust. When the corresponding engine speed for the engines reaches a first threshold associated with a first engine position, the engine associated with the first engine position is allowed to transition through the NDZ while the other engine(s) are held out of the NDZ. When the corresponding engine speed reaches a second threshold associated with a second engine position, the engine associated with the second engine position is allowed to transition through the NDZ. Each engine is thus operated independently from the other engines, as a function of its own transition thresholds for the NDZ.

Figure 3:
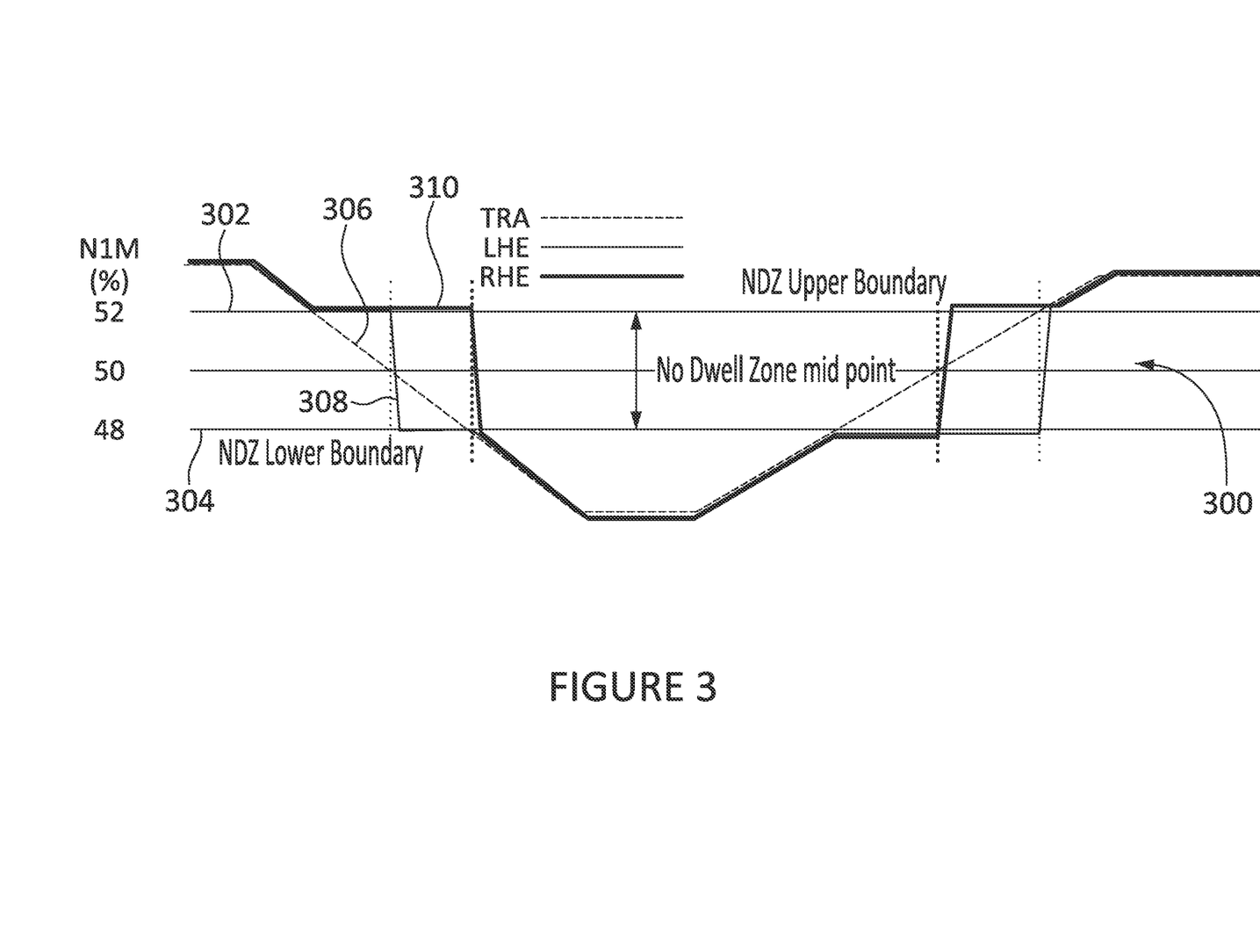
FIG. 3 is a graphical representation of controlling engine speed around a selected speed range for two engines, in accordance with some embodiments.

A specific and non-limiting example for two engines is presented in FIG. 3. A first engine, such as engine 100a, is referred to as the left-hand engine (LHE). A second engine, such as engine 100b, is referred to as the right-hand engine (RHE). The speed of the LHE is shown at 308, the speed of the RHE is shown at 310.

A NDZ 300 comprises an upper boundary 302 at 52% of N1 (i.e. the rotational speed of the low pressure spool) and a lower boundary 304 at 48% of N1. Note that other reference speeds may be used, such as N2 (the rotational speed of the high pressure spool), N3 (the rotational speed of a third spool), fan speed, and the like. The range of 4% of N1 and the specific values for the upper and lower boundaries are used merely to illustrate the principle and should not be construed as limiting.

A request to generate a given thrust for the LHE and RHE is received. A corresponding engine speed is determined in accordance with the given thrust. It will be understood that whenever the given thrust changes (as a function of a change in the request or a change in other parameters), a new corresponding engine speed is determined. The curve 306 thus represents the corresponding engine speed as it changes over time.

The corresponding engine speed 306 begins above the NDZ 300, decreases until it falls below the lower boundary 304, remains below the NDZ 300 for a certain time period and then increases back up to above the upper boundary 302. Outside of the NDZ 300, the speeds 308, 310 of the LHE and RHE substantially track the corresponding engine speed 306. When the corresponding engine speed 306 reaches the upper boundary 302, both engines are held at the boundary 302 until the corresponding engine speed 306 reaches a first engine-specific threshold, assigned to the LHE. In this example, the LHE-specific threshold for transitioning downwards through the NDZ 300 is 50% of N1, which is the mid-point of the NDZ 300. When the corresponding engine speed 306 reaches the LHE-specific threshold, the LHE transitions through the NDZ 300 to the lower boundary 304. The RHE is held back at the upper boundary 302.

While the corresponding engine speed 306 continues to decrease between 50% and 48% of N1, the LHE is held at the lower boundary 304 and the RHE is held at the upper boundary 302. This continues until the corresponding engine speed 306 reaches a second engine-specific threshold, assigned to the RHE. In this example, the RHE-specific threshold for transitioning downwards through the NDZ 300 is 48% of N1, which is the lower boundary 304 of the NDZ 300. When the corresponding engine speed 306 reaches the RHE-specific threshold, the RHE transitions through the NDZ 300 to join the LHE at the lower boundary 304. As the corresponding engine speed 306 continues to decrease below the lower boundary 304, the LHE and RHE speeds 308, 310 once again substantially track the corresponding engine speed 306.

In some embodiments, the engine-specific thresholds are set to the upper and lower boundaries of the NDZ, respectively. In some embodiments, one engine-specific threshold is set to the upper or lower boundary and the other engine-specific threshold is set to a value within the NDZ. In some embodiments, both engine-specific thresholds are set to values within the NDZ.

In some embodiments, the order of transition through the NDZ 300 is reversed when going upwards through the NDZ compared to when the engines transition downwards through the NDZ. For example, the LHE is favored when going downwards through the NDZ and the RHE is favored when going upwards through the NDZ 300. This is illustrated in FIG. 3, where the LHE 308 is held back at the lower boundary 304 as the RHE 310 transitions from the lower boundary 304 to the upper boundary 302.

In some embodiments, the two engines are each held at a respective boundary of the NDZ as the corresponding engine speed moves from the first engine-specific threshold to the second engine-specific threshold. As the two engines straddle the NDZ, the sum thrust delivered by the two engines is equivalent to having both engines operating at the mid-point of the NDZ.

In some embodiments, the sum thrust of the engines is modulated by biasing up the speed of the engine operating on or above the upper boundary of the NDZ or by biasing down the speed of the engine operating at or below the lower boundary of the NDZ. This is to provide the full range of thrust covered by the speeds of the NDZ without having the engines operate at speeds in the NDZ. This approach allows smooth thrust modulation in the NDZ and prevents the engines from hunting or toggling back and forth repeatedly through the NDZ.

Figure 4:
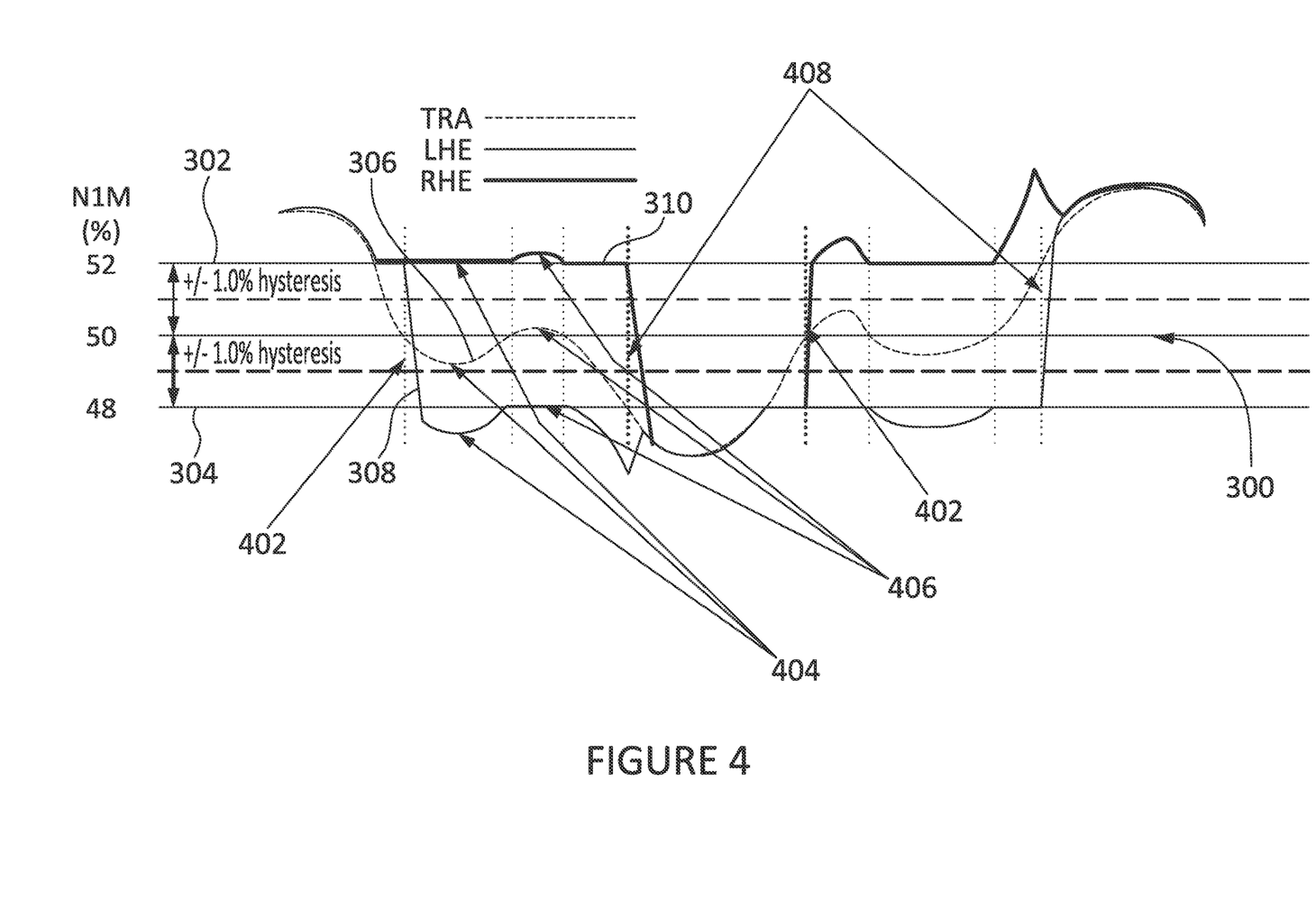
FIG. 4 is a graphical representation of controlling engine speed around a selected speed range for two engines with thrust modulation, in accordance with some embodiments.

With reference to FIG. 4, there is illustrated an example with thrust modulation. In this example, the corresponding engine speed 306 is shown to operate in the NDZ 300 for a longer period than that shown in the example of FIG. 3. When the corresponding engine speed 306 has reached the LHE-specific threshold of 50% of N1, the LHE speed 308 transitions from the upper boundary 302 to the lower boundary 304 and the RHE speed 310 remains at the upper boundary 304. When the given thrust is less than the mid-point of the NDZ 300 and the two engines are straddling the NDZ 300, the speed of the engine at the lower boundary 304, namely the LHE speed 308 in this particular example, is modulated downwards to provide a total thrust from the LHE and the RHE that corresponds to the given thrust. When the given thrust is greater than the mid-point of the NDZ 300 and the two engines are straddling the NDZ 300, the speed of the engine at the upper boundary 302, namely the RHE speed 310 in this particular example, is modulated upwards to provide a total thrust from the LHE and the RHE that corresponds to the given thrust.

When the corresponding engine speed 306 reaches the RHE-specific threshold of 48% of N1, the RHE speed 310 transitions downwards through the NDZ 300. As the corresponding engine speed 306 continues to move downwards, the LHE and RHE speeds 308, 310 return to tracking the corresponding engine speed 306.

The staggered engine-specific thresholds position the engine speeds above and below the NDZ to allow for thrust modulation. This allows minimal transitions through the NDZ while maintaining a same overall thrust response as requested by the input device 230.

Thrust modulating is enabled at 402, i.e. after entry into the NDZ but not before the corresponding engine speed 306 crosses the midpoint of the NDZ 300. Thrust modulating is disabled at 408, i.e. any time the corresponding engine speed 306 exits the NDZ 300 (lower or upper boundary). Thrust modulating doubles the N1 request such that one engine supplies the equivalent thrust increase/decrease of two engines while the other engine governs steady state on the opposite boundary (see 404, 406). Note that the drawings are not to scale.

The staggered engine-specific thresholds can be tuned for different system gains. In some embodiments, there is a hysteresis to allow for a certain response time of the system. For example, in FIG. 4, there is a +/−1.0% hysteresis value in the 50-52% range of the NDZ for the LHE and a +/−1.0% hysteresis value in the 48-50% band for the RHE. If a quicker response time is required, these hysteresis bands can be reduced, for example to +/−0.5% at 51% for the LHE and +/−0.5% at 49% for the RHE. This will command each engine to transition through the NDZ sooner to anticipate a faster response if required.

The staggered engine-specific thresholds can be used to define when engines on the upper and lower bands start and stop thrust modulation on their respective boundaries. In the examples illustrated, the LHE starts to modulate thrust when the corresponding engine speed 306 transitions below 50% and the LHE is operating below 48%. The LHE stops modulating thrust when the corresponding engine speed 306 transitions above 50% and the LHE is operating at or below 48%. The 50% and 48% trigger points for the LHE can be modified if desired to a larger or smaller band to improve overall total thrust response of the system. Likewise the RHE starts to modulate thrust when the corresponding engine speed 306 transitions above 50% and the RHE is above 52%. The RHE stops modulating thrust when the corresponding engine speed 306 transitions below 50% and the RHE is operating at or above 50%. The 50% and 52% trigger points for the RHE can be modified if desired to a larger or smaller band to improve overall thrust response of the system if required.

In some embodiments, an operation mode is enabled and/or disabled as a function of certain conditions for managing operation of the engines around the NDZ. In some embodiments, flight phase is used as a condition to enable and/or disable the operation mode. For example, the operation mode may be enabled on approach, taxiing or cruise. In some embodiments, ambient conditions are used to enable and/or disable the operation mode. For example, the operation mode may be enabled in certain icing conditions, aircraft configurations, pump vibration modes, structural resonance modes, resonance modes between systems etc. In some embodiments, the operation mode may be enabled when the autopilot and/or autothrottle system are active and disabled otherwise. In certain embodiments, a combination of conditions are used, such as flight phase and/or ambient conditions and/or autopilot. In other embodiments, a combination of inputs from pressure transducers, vibration pick-ups, speed sensors or microphones can be used to detect where and when certain critical speeds are present and are to be avoided. In other embodiments, the NDZ could be used for the high speed spool(s) that may drive a gearbox and other components rather than the low speed spool that provides the majority of the thrust.

Figure 5:
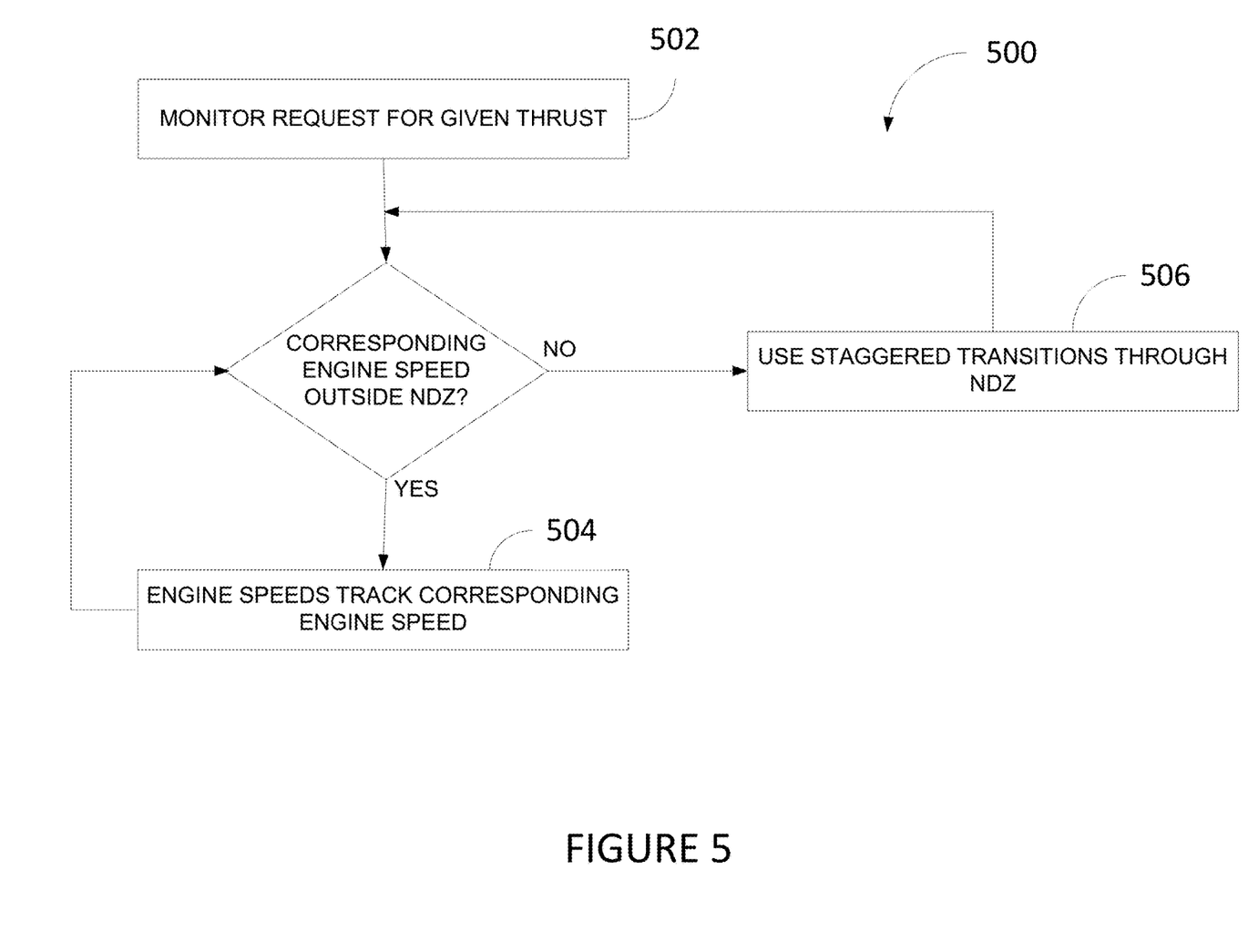
FIG. 5 is a flowchart of an example method for controlling engine speed around a selected speed range for a multi-engine aircraft, in accordance with some embodiments.

With reference to FIG. 5, there is illustrated a more general framework of a method 500 for managing engine speed around a selected speed range having a first boundary and a second boundary, for a multi-engine aircraft. At step 502, the request to generate a given thrust for the engines is monitored. In some embodiments, step 502 involves converting the given thrust to a corresponding engine speed.

When the corresponding engine speed is outside of the selected speed range, including or excluding the boundaries, the method 500 proceeds to step 504 where the engine speeds substantially track the corresponding engine speed. When the corresponding engine speed is within the selected speed range, including or excluding the boundaries, the method 500 proceeds to step 506 where the transition of the engines through the selected speed range is staggered, for example by allowing a first engine speed to transition through the selected speed range while holding a second engine speed outside of the selected speed range, or vice versa.

In some embodiments, the boundaries of the selected speed range are used as the triggers to transition the first and second engine speeds through the selected speed range. For example, the first engine speed transitions when the corresponding engine speed crosses the upper boundary and the second engine speed transitions when the corresponding engine speed crosses the lower boundary. This order may remain the same when crossing through the selected speed range from lower boundary to upper boundary, or it may be reversed.

In some embodiments, speed thresholds are used as triggers to transition the first and second engine speeds through the selected speed range, where the speed thresholds may be a boundary or may be a value inside the boundaries. Each speed threshold is associated with a given engine. For example, a first speed threshold is associated with the first engine and a second and lower speed threshold is associated with the second engine.

Figure 6:
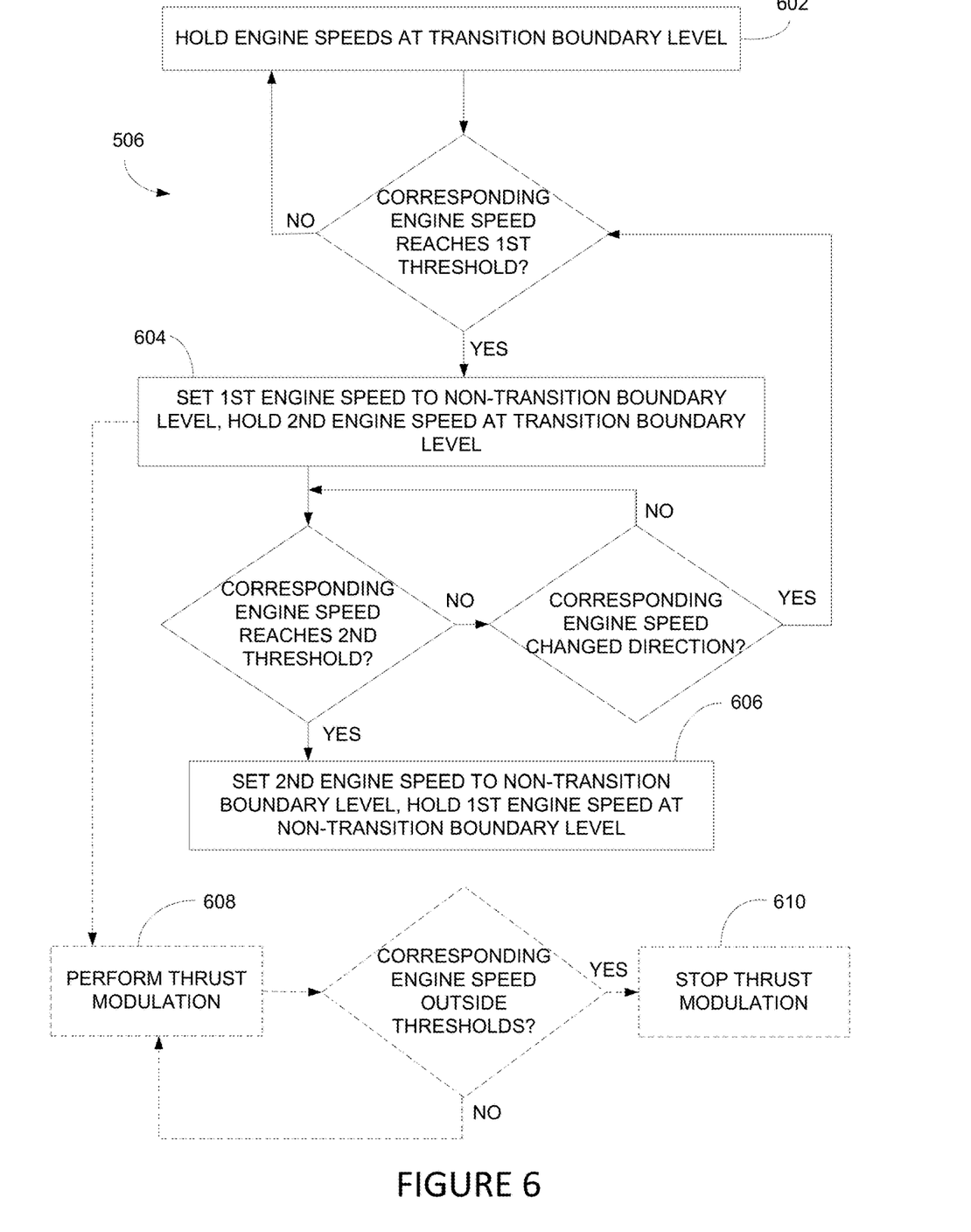
FIG. 6 is a flowchart of an example method for staggering transition of engines through a selected speed range, in accordance with some embodiments.

FIG. 6 illustrates an example embodiment of step 506 of the method 500 when using thresholds to stagger the transition of two engines through the selected speed range. Note that the path through the flowchart may differ depending on whether the approach is from the upper or lower boundary. Also note that the path through the flowchart may differ depending on whether the method 500 is applied to the left-hand engine or the right-hand engine.

At step 602, the corresponding engine speed is no longer outside of the selected speed range, and therefore the speeds of the two engines are held at a transition boundary, i.e. the boundary that has just been crossed by the corresponding engine speed. If the corresponding engine speed reaches the first threshold associated with the position of the first engine, the speed of the first engine is set to the non-transition boundary, i.e. the boundary opposite to the boundary that has just been crossed by the corresponding engine speed, and the speed of the second engine is held at the transition boundary, as per step 604.

If the corresponding engine speed continues to advance in the same direction and reaches the second threshold associated with the position of the second engine, the speed of the second engine is set to the non-transition boundary and the speed of the first engine is held at the non-transition boundary, as per step 606.

It should be understood that while the steps of 506 are being performed, a continuous or periodic check as to whether the corresponding engine speed is outside the selected speed range is performed concurrently, as per the method 500. Accordingly, the method 500 may exit step 506 at any time and move to step 504, should the corresponding engine speed exit the selected speed range.

In some embodiments, the speed thresholds are position dependent. For example, the first threshold is associated with a left hand engine and the second threshold is associated with a right hand engine. This may be adapted for more than two engines.

In some embodiments, when the speed of one engine is transitioned through the selected speed range, the other engine speed is held at a boundary. For example, when the two engine speeds are at a first boundary and the first threshold is met, the first engine speed is set to the second boundary and the second engine speed is held at the first boundary. When the second threshold is met, the second engine speed is set to the second boundary and the first engine speed is held at the second boundary.

In some embodiments, the first engine speed is held at the second boundary and the second engine speed is held at the first boundary after the first speed threshold has been met and until the second speed threshold is met. This provides an average speed for the two engines which falls in the midpoint of the selected speed range.

In some embodiments, only the first or second engine speed is held at a respective one of the second boundary and the first boundary after the first threshold is met and before the second threshold is met. The other engine speed is modulated outside of the selected speed range as a function of the given thrust. This provides the entire range of thrust (which is a function of engine speed) that would be generated inside the selected speed range while maintaining the engine speeds above or below the selected speed range, when required. The modulation of the engine speeds above or below the selected speed range can be tuned relative to the given thrust to supply the same thrust that both engines would supply outside the selected speed range, thereby maintaining the same thrust response, for example for the aircraft autopilot system. This approach reduces or eliminates the need to transition repeatedly through the selected speed range if the aircraft needs thrust modulation in the selected speed range, thus eliminating time spent by the engine speeds in the selected speed range and eliminating thrust bumps that may be generated by having the engines repeatedly transition through the selected speed range to maintain the desired average thrust for the autopilot system.

An example embodiment for thrust modulation is illustrated at steps 608 and 610 of FIG. 6, where thrust modulation is performed at step 608 and is stopped at step 610 when the corresponding engine speed falls outside of the thresholds. This embodiment assumes that the thresholds form part or all of the triggers to begin thrust modulation. In some embodiments, other values within the selected speed range may be selected as the triggers to perform thrust modulation. In some embodiments, thrust modulation is enabled the first time the corresponding engine speed enters the NDZ from either boundary (i.e. upper or lower) but not before the corresponding engine speed crosses the midpoint of the NDZ. Thrust modulation is immediately disabled any time the corresponding engine speed exits the NDZ from either boundary. To reset the thrust modulation, the enabling conditions must be met again.

It will be understand that the engine speeds can approach and transition through the selected speed range from above or below using the framework illustrated in FIGS. 5 and 6.

Figure 7:
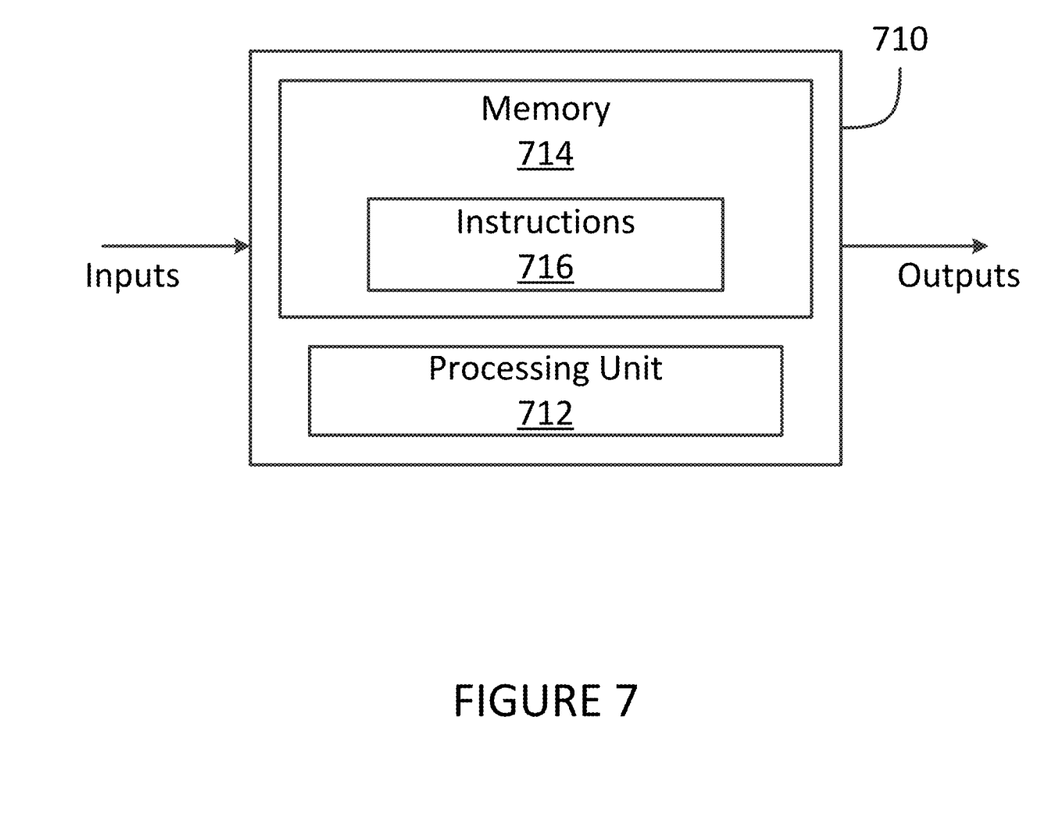
FIG. 7 is a block diagram of a computing device for implementing the method of FIG. 5, in accordance with some embodiments.

With reference to FIG. 7, some or all of the method 500 of FIG. 5 may be implemented by a computing device 710 as an embodiment of one or both engine controllers 210a, 210b. In some embodiments, the entire method 500 is performed by each engine controller 210a, 210b independently, as it relates to a respective engine 100a, 100b. For example, and with reference to FIG. 6, engine controller 210a associated with engine 100a may perform steps 602, 604, and 606 as they relate to engine 100a, namely holding the engine speed of engine 100a at the transition boundary at step 602, setting the engine speed of engine 100a to the non-transition boundary at step 604, and holding the engine speed of engine 100a to the non-transition boundary level at step 606. Similarly, engine controller 210b associated with engine 100b may perform steps 602, 604, and 606 as they relate to engine 100b, namely holding the engine speed of engine 100b at the transition boundary at steps 602 and 604, and setting the engine speed of engine 100b at the non-transition boundary at step 606.

In some embodiments, steps of the method 500 that are common to both engine controllers 210a, 210b are performed by a single computing device 710 and steps that are unique to a given engine controller 210a, 210b are performed by a separate computing device 710. Other implementations may also apply.

The computing device 710 comprises a processing unit 712 and a memory 714 which has stored therein computer-executable instructions 716. The processing unit 712 may comprise any suitable devices configured to implement the functionality of the engine controller 710 such that instructions 716, when executed by the computing device 710 or other programmable apparatus, may cause the functions/acts/steps to be executed. The processing unit 712 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, custom-designed analog and/or digital circuits, or any combination thereof.

The memory 714 may comprise any suitable known or other machine-readable storage medium. The memory 714 may comprise non-transitory computer readable storage medium, for example, but not limited to, an electronic, magnetic, optical, electromagnetic, infrared, or semiconductor system, apparatus, or device, or any suitable combination of the foregoing. The memory 714 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 414 may comprise any storage means (e.g., devices) suitable for retrievably storing machine-readable instructions 716 executable by processing unit 712.

It should be noted that the computing device 710 may be implemented as part of a FADEC or other similar device, including electronic engine control (EEC), engine control unit (EUC), engine electronic control system (EECS), and the like. In addition, it should be noted that the techniques described herein can be performed by an engine controller 210 substantially in real-time.

It should also be noted that the memory 714 can serve to store speed data points, threshold speeds, thrust modulation triggers or any other data used for the purpose of performing the method 500. In some embodiments, the memory 714 can include multiple memory units, or can be subdivided into partitions or subsections, and each partition or subsection can be assigned to a different task, including storing the speed data points and/or other data, as appropriate.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure.

Various aspects of the systems and methods described herein may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Although particular embodiments have been shown and described, it will be apparent to those skilled in the art that changes and modifications may be made without departing from this invention in its broader aspects. The scope of the following claims should not be limited by the embodiments set forth in the examples, but should be given the broadest reasonable interpretation consistent with the description as a whole.

The invention claimed is:

1. A method for controlling engine speed in a multi-engine aircraft, the method comprising:
monitoring a request for a first engine and a second engine to generate a given thrust;
determining a corresponding engine speed for the first engine and the second engine in accordance with the given thrust;
when the corresponding engine speed is outside of a selected speed range, the speed range having a first boundary and a second boundary, allowing a first engine speed and a second engine speed to track the corresponding engine speed; and
when the corresponding engine speed is within the selected speed range, staggering transition of the first engine speed and the second engine speed through the selected speed range by allowing one of the first engine speed and the second engine speed to transition through the selected speed range while holding the other of the first engine speed and the second engine speed outside of the selected speed range.

2. The method of claim 1, wherein staggering the transition of the first engine speed and the second engine speed through the selected speed range comprises:
setting the first engine speed to the second boundary when a first threshold associated with the first engine is reached; and
setting the second engine speed to the second boundary when a second threshold associated with the second engine is reached;
wherein the first threshold and the second threshold are inside the selected speed range.

3. The method of claim 2, wherein staggering the transition of the first engine speed and the second engine speed through the selected speed range further comprises:
 holding the first engine speed and the second engine speed at the first boundary until the first threshold is met; and
 holding the first engine speed at the second boundary and the second engine speed at the first boundary after the first threshold is met and until the second threshold is met.

4. The method of claim 2, wherein staggering the transition of the first engine speed and the second engine speed through the selected speed range further comprises:
 holding one of the first engine speed and the second engine speed at a respective one of the second boundary and the first boundary after the first threshold is met and before the second threshold is met; and
 modulating the other one of the first engine speed and the second engine speed outside of the selected speed range as a function of the thrust request.

5. The method of claim 2, wherein the first threshold is at a midpoint within the selected speed range, and wherein the second threshold is at the second boundary.

6. The method of claim 1, wherein staggering the transition of the first engine speed and the second engine speed through the selected speed range comprises:
 transitioning the first engine speed through the selected speed range before transitioning the second engine speed through the selected speed range when the corresponding engine speed moves from the first boundary to the second boundary; and
 transitioning the second engine speed through the selected speed range before transitioning the first engine speed through the selected speed range when the corresponding engine speed moves from the second boundary to the first boundary.

7. The method of claim 1, wherein monitoring the thrust request comprises monitoring the thrust request from an autopilot system of the aircraft.

8. The method of claim 1, wherein the first engine is one of a left engine and a right engine and the second engine is the other one of the left engine and the right engine, and wherein an order of transition through the selected speed range is engine-position dependent.

9. The method of claim 1, wherein an operation mode is enabled to allow staggering of the transition of the first engine speed and the second engine speed through the selected speed range.

10. The method of claim 9, wherein the operation mode is enabled as a function of flight phase and/or ambient conditions.

11. A system for controlling engine speed in a multi-engine aircraft, the system comprising:
 at least one processing unit; and
 a non-transitory computer-readable medium having stored thereon program instructions executable by the at least one processing unit for:
  monitoring a request for a first engine and a second engine to generate a given thrust;
  determining a corresponding engine speed for the first engine and the second engine in accordance with the given thrust;
  when the corresponding engine speed is outside of a selected speed range, the speed range having a first boundary and a second boundary, allowing a first engine speed and a second engine speed to track the corresponding engine speed; and
  when the corresponding engine speed is within the selected speed range, staggering transition of the first engine speed and the second engine speed through the selected speed range by allowing one of the first engine speed and the second engine speed to transition through the selected speed range while holding the other of the first engine speed and the second engine speed outside of the selected speed range.

12. The system of claim 11, wherein staggering the transition of the first engine speed and the second engine speed through the selected speed range comprises:
 setting the first engine speed to the second boundary when a first threshold associated with the first engine is reached; and
 setting the second engine speed to the second boundary when a second threshold associated with the second engine is reached;
 wherein the first threshold and the second threshold are inside the selected speed range.

13. The system of claim 12, wherein staggering the transition of the first engine speed and the second engine speed through the selected speed range further comprises:
 holding the first engine speed and the second engine speed at the first boundary until the first threshold is met; and
 holding the first engine speed at the second boundary and the second engine speed at the first boundary after the first threshold is met and until the second threshold is met.

14. The system of claim 12, wherein staggering the transition of the first engine speed and the second engine speed through the selected speed range further comprises:
 holding one of the first engine speed and the second engine speed at a respective one of the second boundary and the first boundary after the first threshold is met and before the second threshold is met; and
 modulating the other one of the first engine speed and the second engine speed outside of the selected speed range as a function of the thrust request.

15. The system of claim 12, wherein the first threshold is at a midpoint within the selected speed range, and wherein the second threshold is at the second boundary.

16. The system of claim 11, wherein staggering the transition of the first engine speed and the second engine speed through the selected speed range comprises:
 transitioning the first engine speed through the selected speed range before transitioning the second engine speed through the selected speed range when the corresponding engine speed moves from the first boundary to the second boundary; and
 transitioning the second engine speed through the selected speed range before transitioning the first engine speed through the selected speed range when the corresponding engine speed moves from the second boundary to the first boundary.

17. The system of claim 11, wherein monitoring the thrust request comprises monitoring the thrust request from an autopilot system of the aircraft.

18. The system of claim 11, wherein the first engine is one of a left engine and a right engine and the second engine is the other one of the left engine and the right engine, and wherein an order of transition through the selected speed range is engine-position dependent.

19. The system of claim 11, wherein an operation mode is enabled to allow staggering of the transition of the first engine speed and the second engine speed through the selected speed range.

20. The system of claim 19, wherein the operation mode is enabled as a function of flight phase and/or ambient conditions.

* * * * *